United States Patent Office 3,817,769
Patented June 18, 1974

3,817,769
POLYSILOXANE COATING COMPOSITION
Leonard F. Fisher, 7 Dunfries Terrace,
San Rafael, Calif. 94901
No Drawing. Filed Sept. 14, 1971, Ser. No. 180,520
Int. Cl. C08h 5/00; C08g 47/02, 51/14
U.S. Cl. 106—287 SB                     9 Claims

ABSTRACT OF THE DISCLOSURE

Novel polysiloxane compositions are provided for coating non-porous substrates comprising an alkanolic medium, a small amount of a polysiloxane resin and a surface hardener. The surface hardeners are either phenothiazine dyes or a mild abrasive, either separately or in combination.

BACKGROUND OF THE INVENTION

Field of the invention

Polysiloxane coatings impart a variety of desirable properties to non-porous surfaces, such as glass, marble, ceramics, metals, plastics, etc. The polysiloxane provides a water repellent surface, as well as a protective surface. In addition, the polysiloxane provides an aesthetically pleasing sheen to the surface.

In many applications of a polysiloxane composition it is desirable that the composition be stable during storage for long periods of time. Polysiloxanes are frequently only difficultly dispersed even in alkanolic systems. Furthermore, while this alkanol systems have many desirable properties, it is found that the polysiloxane coating from an alkanol solution of a polysiloxane after evaporation of the alkanol is relatively soft and has an undesirable tactile sensation.

Curing agents which have been taught for use with polysiloxanes are frequently unsatisfactory, where the composition is to be applied manually. Mineral acids and even carboxylic acids in organic solvents, such as alkanols, can be very irritating to the skin. Also, many people are sensitive to acid and would have to be protected from contact with such solutions. Other catalysts require heating, which are inappropriate for home use.

A desirable system should be easily applied manually without irritating affects to the hands, would be relatively safe as far as combustibility, and during storage would be stable or readily redispersable for long periods of time. In addition, the solution should dry rapidly to a hard, tough, water repellent surface having good optical characteristics.

Description of the prior art

Numerous patents have issued describing polysiloxane compositions for coating. Illustrative U.S. patents include U.S. Pat. Nos. 2,827,440, 3,009,833, 3,079,281, 3,102,049, 3,305,502, 3,308,088, 3,350,330, 3,457,221, and 3,579,540. See also Australian Pat. No. 248,825.

SUMMARY OF THE INVENTION

Novel compositions are provided for treating non-porous surfaces so as to provide a tough durable water repellent coating having good optical properties. The compositions comprise an alkanolic solution of an alkyl polysiloxane containing at least one hardness enhancing additive. The hardness enhancing additive is normally either an aminophenothiazine dye or a mild abrasive, which is present in minor but sufficient amount. The composition is applied to the non-porous surface by any convenient means and the volatile materials allowed to evaporate.

DESCRIPTION OF THE SPECIFIC EMBODIMENTS

Tough adherent water repellent coatings can be provided to non-porous substrates by employing a relatively dilute alkanolic solution of an alkyl polysiloxane containing a small but sufficient amount of a hardening agent. The resulting composition has a long storage life, can be manually applied to the surface, if desired, and rapidly dries to a hard, durable, water repellent, protective surface having desirable optical properties.

The polysiloxane which is employed will for the most part have the following formula:

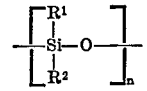

wherein $R^1$ and $R^2$ are lower alkyl of from 1 to 6 carbon atoms, more usually of from 1 to 3 carbon atoms, and preferably 1 carbon atom, i.e. methyl; $n$ indicates the order of the polymer to provide the desired viscosity.

The polysiloxanes which are employed will have viscosities of from about 10 to 500, more usually from 25 to 100 and preferably about 30 to 75 centistokes at 25° C. These alkyl polysiloxanes are found to provide coatings having the most desirable physical properties.

The medium employed is an alkanolic medium of alcohols of from 2 to 4 carbon atoms, particularly 3 carbon atoms, and preferably $n$-propanol or 2-propanol. The $n$-propanol is the preferred solvent because of its higher flash point and more acceptable fragrance as compared to 2-propanol. On addition, the protective coatings obtained employing $n$-propanol as the medium, as well as the properties of the coating composition, are found to be particularly desirable. Small amounts of water may be present in the alkanol, normally from about 0 to 10 volume percent, preferably from 0 to 5 volume percent.

Included in the composition is an additive to enhance the hardness and texture of the coating surface. One group of additives are the dyes based on aminoacridines which have the following formula:

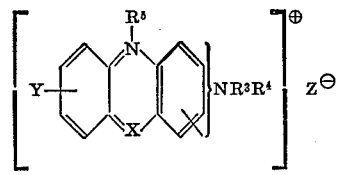

wherein $R^3$ and $R^4$ are hydrogen or hydrocarbon of from 1 to 12 carbon atoms, more usually of from 1 to 8 carbon atoms, and preferably lower alkyl of from 1 to 3 carbon atoms; X is carbon (=CH—, methine), oxygen (=O—+), sulfur (=S—+), or nitrogen (=N—); when X is carbon or nitrogen, $R^5$ is hydrogen or hydrocarbon of from 1 to 8 carbon atoms, more usually of from 1 to 6 carbon atoms, and when X is sulfur or oxygen, $R^5$ is an unshared pair of electrons; Y is hydrogen or an organic functionality of from 0 to 8 carbon atoms, including amino, hydrocarbylamino, dihydrocarbylamino, particularly lower alkylamino or di(lower alkyl)amino, halo, hydroxy, hydrocarbyloxy, etc. and particularly substituted in the 6 and 7 positions; and Z is any convenient anion, particularly halo, e.g. chloro, and sulfate.

Preferred compounds are those which have X as sulfur and Y is amino or dialkylamino. These compounds are phenothiazines of the following formula:

$$\left[ Y^1 \!\!-\!\!\! \underset{S}{\underset{|}{\bigodot\!\!\!\bigodot\!\!\!\bigodot}} \!\!-\!\! NR^6R^7 \right]^{\oplus} Z^{\ominus}$$

wherein $R^6$ and $R^7$ are hydrogen or lower alkyl of from 1 to 3 carbon atoms, $Y^1$ is hydrogen amino, lower alkylamino or di(lower alkyl)amino, wherein the lower alkyl groups are from 1 to 3 carbon atoms, and is preferably in the 7 position, and $Z^1$ is a convenient anion, particularly halo.

Illustrative compounds include Lauth's violet, methylene blue, Capri blue, etc.

As an alternative or, preferably, in combination with, the dye, mild abrasive materials may be used. Various soft mildly abrasive extremely fine powders may be employed in the alkanol solution and dispersed by agitation. Exemplary materials include talc, rotten stone, fine emery, etc.

Other additives may also be added as desired, depending on the final use and the method of application.

While acidic materials are not required, they can be used for further enhancing the final properties of the coating. Acids which may be used include both mineral and carboxylic acids, such as sulfamic acids, sulphuric acid, citric acid, etc. The acids which may be used are amply described in U.S. Pat. Nos. 3,579,540, and 3,457,221. When using acids, it is preferred that the composition be applied without contact to the skin. Therefore, if manual application is to be employed, rubber gloves will be used in applying the composition.

Other additives include emulsifiers, particularly when employing small amounts of the mild abrasive. Various emulsifiers include polyoxyethylene stearate, sorbitan monolaurate, polyethoxylated sorbitol, etc., that is, non-ionic emulsifiers.

Numerous other additives may be added as desired, such as anti-static agents, stabilizers, anti-foaming agents, etc.

The polysiloxane will be added in amounts of at least about 2 weight percent based on the total composition and not more than about 12 weight percent, preferably in the range of about 4 to 10 weight percent and particularly preferred from about 5 to 8 weight percent. While larger amounts of the siloxane may be employed, they are only difficultly soluble at the higher concentrations, and significant advantages are not achieved.

The amount of hardening agent employed will depend on the particular hardening agent used and whether by itself or in combination with the other hardening agent. Normally, the dye will be employed in at least 0.005 weight percent of the total composition and not more than about 0.2 weight percent, preferably in the range of about 0.01 to 0.1 weight percent. Usually, particularly for manual application, the amount of dye employed will not stain the hands.

When a mild abrasive is employed, it will usually be present in less than about 5 weight percent, preferably less than about 2 weight percent, and normally in the range of about 0.1 to 1 weight percent. Normally, the abrasive will settle upon long standing, but can be readily dispersed, either by using an easily dispersible abrasive or by adding a small amount of an emulsifier.

The other miscellaneous additives will normally be present in from about 0.0001 weight percent to about 2 weight percent, normally in the range of about 0.01 percent to 1 weight percent. For the acid, a minimum amount is desirable, normally in the range of about 0.1 to 1 weight percent. For the emulsifier, the amount will normally range from about 0.0001 weight percent to about 0.05 weight percent.

The compositions employed in this invention are readily prepared by first dissolving any acid or other miscellaneous additive in the alkanolic medium. The dye is then added and preferably the mixture agitated until the dye is completely dissolved. If the abrasive is added, it is agitated to provide a reasonably homogeneous dispersion of the abrasive in the medium. To the alkanolic medium is then added the polysiloxane with agitation. With the exception of the abrasive, the mixture is found to be stable for a long period of time, without separation of the polysiloxane from the alkanol.

The compositions of this invention may be applied to a surface by any convenient means, including spraying, rubbing, dipping, brush coating, etc. However, the product is directed to and primarily concerned with manual application, whereby it is rubbed onto the surface and, if desired, mildly buffed. The composition is spread to provide a thin coating on the surface, of a fraction of a mil or small number of mils and the volatile materials allowed to evaporate under ambient conditions. Once the coating has dried, it is hard, durable, water repellent and has bright optical properties. This is particularly true when the dye is employed as a hardening agent, particularly a blue dye, such as methylene blue. No further treatment of the coating is required and the coating retains its clean and tough water repellent properties for long periods of time.

If desired, to provide a thinner coating, the alkanolic medium may be diluted either with an alkanol or water. Dilution will vary from about 1 to 20 fold. With water, the solution becomes cloudy, but if used promptly, the polysiloxane remains uniformly dispersed in the system.

A variety of compositions were prepared to demonstrate the invention employing n-propanol and from 7 to 10 weight percent of dimethylpolysiloxanes from different sources. Satisfactory siloxanes were found to be Union Carbide's L-45, having a viscosity of from 40 to 60 cs. at 25° C. and General Electric's dimethylsilicone polymer SF-96, having a viscosity of 50 cs. Two groups of compositions were prepared, ones having and one not having about one weight percent sulfamic acid. These compositions were further divided into those having and those not having approximately 0.01 weight percent of methylene blue. In a number of compositions, a mild abrasive derived from Ajax Cleanser was employed, so that the various compositions included propanol as the medium with different siloxane polymers within a relatively narrow viscosity range, with some having only methylene blue as the hardener, some having only Ajax as the hardener, and some having the combination of sulfamic acid with methylene blue and sulfamic acid with Ajax, the patents referred to on the Ajax label are U.S. Pat. Nos. 3,108,078, and 3,406,116. In addition, there was the combination of Ajax and methylene blue with propanol and the siloxane polymer. All of the compositions were applied to non-porous surfaces, such as marble, onyx and glass, and allowed to dry and the texture of the surface evaluated. In every case, where methylene blue or Ajax Cleanser was employed, a bright clear surface was achieved which was tough, durable, pleasant to the touch and water repellent.

In accordance with this invention, non-porous surfaces may be protected and made water repellent by employing alkanolic compositions containing a small amount of polysiloxane with a hardening agent. The resulting surfaces are durable, capable of lasting for long periods of time, and impart desirable optical properties, such as brightness and clarity to the substrate. In addition, the alkanolic compositions are found to be storage stable for long periods of time in providing uniformity and homogeneity of the composition. When applied to the surface and allowed to dry, the resulting layer cures rapidly to a hard durable surface.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A polysiloxane coating composition comprising: in an alkanolic medium, wherein the alkanol is of from 2–4 carbon atoms, di (lower-alkyl) polysiloxane in the range of 2–12 weight percent and as a hardening agent an aminoacridine dye in an amount sufficient to provide the desired degree of hardening, wherein the dye has the formula:

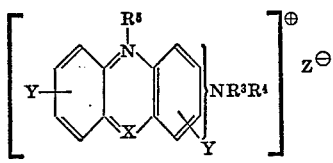

wherein $R^3$ and $R^4$ are hydrogen or hydrocarbon of from 1 to 8 carbon atoms; X is selected from the group consisting of carbon, oxygen sulfur or nitrogen, $R^5$ is hydrogen or hydrocarbon of from 1 to 6 carbon atoms when X is carbon or nitrogen and an unshared pair of electrons, when X is sulfur or oxygen, and Y is hydrogen or an organic functionality of from 0 to 8 carbon atoms; and Z is an anion; and wherein the $NR^3R^4$ group and Y, when Y is an amino organic functionality, are hydrocarbylamino or dihydrocarbylamino.

2. A composition according to claim 1, wherein said alkanol is 3 carbon atoms and said polysiloxane has a viscosity in the range of from about 10 to 500 cs. at 25° C., and containing a small amount of a mild abrasive, in the range of 0.1–5 weight percent.

3. A composition according to claim 2, wherein said alkanol is n-propanol and said polysiloxane has a viscosity of from about 30 to 75 cs. at 25° C.

4. A composition according to claim 1, wherein said alkanol is n-propanol and said polysiloxane has a viscosity in the range of from about 30 to 75 cs. at 25° C.

5. A composition according to claim 1, wherein X is sulfur and $R^3$ and $R^4$ are lower alkyl.

6. A composition according to claim 1, wherein said aminoacridine dye is methylene blue and is present in an amount of from about 0.005 weight percent to about 0.2 weight percent.

7. A composition according to claim 1, wherein said polysiloxane is present in from about 4 weight percent to 10 weight percent.

8. A composition according to claim 1 havnig from 0.1 to 1 weight percent of a mineral acid or carboxylic acid.

9. A coating composition for imparting water repellency and optical brightness which comprises: an n-propanolic medium having from 4 to 10 weight percent of a dimethyl polysiloxane having a viscosity in the range of 30 to 75 cs. at 25° C. and from 0.01 to 0.1 weight percent of methylene blue.

References Cited

UNITED STATES PATENTS

| | | | |
|---|---|---|---|
| 2,777,772 | 1/1957 | Stedman | 117—124 F |
| 3,102,049 | 8/1963 | Quirk | 117—161 Z A |
| 3,350,330 | 10/1967 | Cash et al. | 117—161 Z A |
| 3,522,075 | 7/1970 | Kiel | 117—124 F |
| 3,457,221 | 7/1969 | Stengle | 117—161 Z A |
| 2,938,010 | 2/1960 | Bluestein | 260—46.5 G |
| 3,108,078 | 10/1963 | Wixon | 252—96 |
| 3,350,349 | 10/1967 | Hyde | 260—46.5 G |
| 3,406,116 | 10/1968 | Vitale | 252—155 |

OTHER REFERENCES

McGregor: Silicones and Their Uses, University-Microfilms, Ann Arbor, Mich. (1965), p. 257.

Merck Index, 8th ed., Merck & Co., Rahway, N.J. (1968), pp. 684–685.

MORRIS LIEBMAN, Primary Examiner

H. H. FLETCHER, Assistant Examiner

U.S. Cl. X.R.

117—124 F, 161 ZA; 260—375 B, 46.5 SR, 46.5 G, 279 R